United States Patent [19]
Font

[11] Patent Number: 5,445,067
[45] Date of Patent: Aug. 29, 1995

[54] IMPROVED APPARATUS FOR SQUEEZING CITRUS FRUITS

[76] Inventor: Rafael O. Font, Urbanizacion Entrenaranjos, C/- 104, No. 1, Ribarroja, Valencia, Spain

[21] Appl. No.: 142,242

[22] Filed: Oct. 22, 1993

[30] Foreign Application Priority Data

Oct. 23, 1992 [ES] Spain ................................. 9202127

[51] Int. Cl.6 ............................................. A23N 1/00
[52] U.S. Cl. ........................... 99/502; 99/504; 99/507
[58] Field of Search ................... 99/495, 501–504, 99/505–508; 100/98 R, 213

[56] References Cited

U.S. PATENT DOCUMENTS

| | | | |
|---|---|---|---|
| 746,720 | 12/1903 | Lyon | 99/504 |
| 1,888,528 | 11/1932 | Faulds | 99/504 |
| 1,888,529 | 11/1932 | Faulds | 99/504 |
| 2,065,271 | 12/1936 | Faulds | 99/504 |
| 2,270,007 | 1/1942 | McKinnis | 99/507 |
| 2,602,479 | 7/1952 | Trainor | 99/504 |
| 2,630,849 | 3/1953 | Williams | 99/504 |
| 2,707,981 | 5/1955 | Trainor | 99/507 |
| 2,975,810 | 6/1961 | Wurgaft | |
| 4,479,424 | 10/1984 | Carroll | 100/98 R |
| 4,974,505 | 12/1990 | Torrisi | 99/502 |
| 5,170,699 | 12/1992 | Senalada | 99/507 |
| 5,188,021 | 4/1993 | Bushman et al. | |

FOREIGN PATENT DOCUMENTS 0343488 7/1989 European Pat. Off. .
613243 2/1948 United Kingdom .
1050407 9/1966 United Kingdom .

Primary Examiner—Timothy F. Simone
Attorney, Agent, or Firm—Ostrolenk, Faber, Gerb & Soffen

[57] ABSTRACT

The present invention relates to improvements in machines for squeezing citrus fruits. These improved machines incorporate a novel, high capacity "revolver" system in which oranges or other pieces of fruit are placed. They also include an innovative mechanism for squeezing each piece of fruit, whereby extraction of the juice is carried out by means of a small vertical displacement whereby each half of the piece of fruit, located in an individual alveolus, presses against a corresponding squeezing cone. Conventionally, the extraction of the juice is carried out by means of a simultaneous and coincident rotating motion of the cones and the corresponding alveoli.

By means of the improvements introduced by the present invention, it is possible to achieve very clear fruit juices, taking full advantage of the fruit. Furthermore, the fruit juices can be obtained at room temperature or at colder temperatures. Also the machine in question can be cleaned very easily since it can be assembled and disassembled quickly and easily without the need of any tools. Moreover, it provides a high yield.

As a precaution, the machine in question comprises a transparent cover which, when removed, causes the squeezing mechanism to be paralyzed or disarmed.

7 Claims, 3 Drawing Sheets

IMPROVED APPARATUS FOR SQUEEZING CITRUS FRUITS

BACKGROUND OF THE INVENTION

Currently known orange squeezing machines utilize rotating drums provided with a number of alveoli which act together with squeezing cones which also rotate so as to squeeze halves of oranges or other types of fruit which have been previously cut by a central blade. Ordinarily, squeezing cones rotate by means of a translation movement, the squeezing action being applied gradually to half of an orange or other type of fruit.

These conventional machines do not take full advantage of the juices which can be obtained from the various types of fruit, and in some cases it is very difficult to gain access to machine interiors for cleaning purposes.

SUMMARY OF THE INVENTION

The improvements to machines for squeezing citrus fruits which form the object of the present invention include a number of notable improvements over the conventional machines and at the same time solve to a large extent the problems described above.

A squeezing machine constructed according to the instant invention comprises in general a supply assembly controlled by a revolving divider, two alveoli each with integral rotating arms guided by vertical grooves, a blade for cutting the fruit and a number of squeezing cones. With this arrangement, when a piece of fruit from the supply assembly becomes positioned in one of the two alveoli, the rotating arms together with the alveoli turn through 180° until they reach a lower, opposite position in which the two halves of the piece of fruit are squeezed as the corresponding cones press on them by means of the vertical descending motion of the arms. This piece of fruit is cut in two by the blade positioned between the two circular trajectories of the two alveoli whilst they are facing each other, with each alveolus receiving an equal part of the piece of fruit which, in the final part of its motion, slides along slip ramps. Afterwards, as the alveoli rise, the peel remains suspended above circular windows in each of the ramps which rise in unison a certain amount of time after rising of the alveoli, there being a sufficient delay for the alveoli to cover at least half of the way to their initial position. In this way when the alveoli rotate into their initial position to receive the next piece of fruit and then position themselves once again in front of the circular windows for the squeezing process, pieces of peel are ejected by the alveoli themselves during the final part of their trajectory.

In order that the present invention may be better understood, the accompanying drawings illustrate the object of the invention by way of a non limiting example.

DESCRIPTION OF A PREFERRED EMBODIMENT

Figure 1:
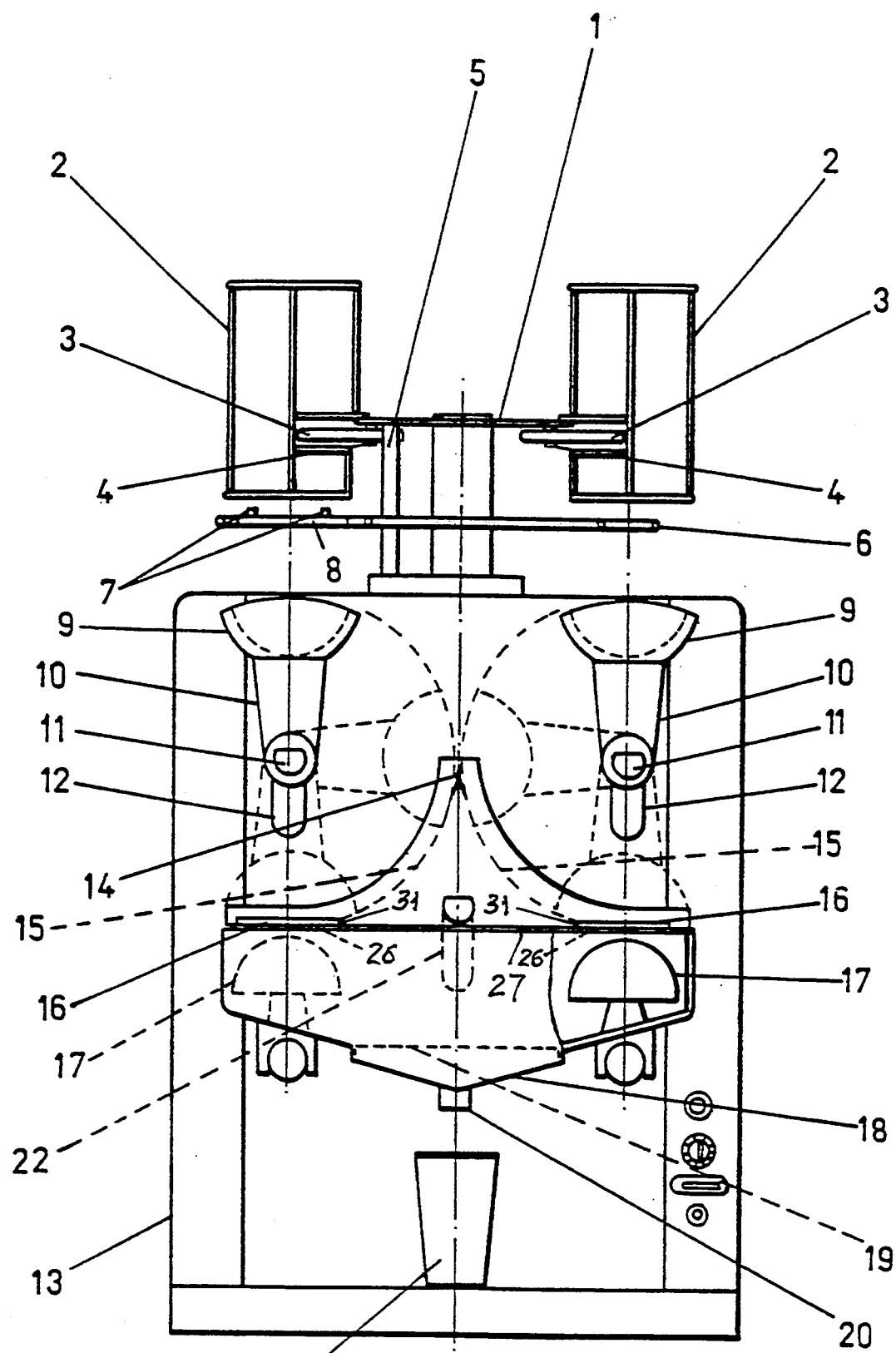
FIG. 1 in a side elevation of a machine for squeezing citrus fruits, which machine incorporates a number of improvements according to the object of the invention.

Referring to the figures, the machines for squeezing citrus fruits in which a number of improvements have been incorporated comprise a supply assembly which consists of revolving load divider 1 to which sleeves 2 for containing the pieces of fruit are coupled, said pieces of fruit being supported by dispensing suspending cams 3 which, when they come into contact with a stop or cam release 5, can pivot in a horizontal plane. Said cams 3 pivot about a small axis 4 connected to the revolving divider 1. Underneath is a slide track 6 for the pieces of fruit provided with a supply window 7 and an unloading step 8.

The pieces of fruit located in the containing sleeves 2 fall one at a time due to the effect of gravity into one of the two alveoli 9, each of which has an integral rotating arm 10 connected to axes 11 which are guided by vertical grooves 12 in the housing 13 of the machine of the invention. As the revolving divider 1 is rotated by impulses, the corresponding dispensing cam 3 comes into contact with the stop 5 and allows one of the pieces of fruit to pass, said piece of fruit becoming settled on the unloading step 8 and the cam 3 returning to its initial position. The piece of fruit is then moved along to the window 7 through which it falls into one of the alveoli 9.

Figure 2:
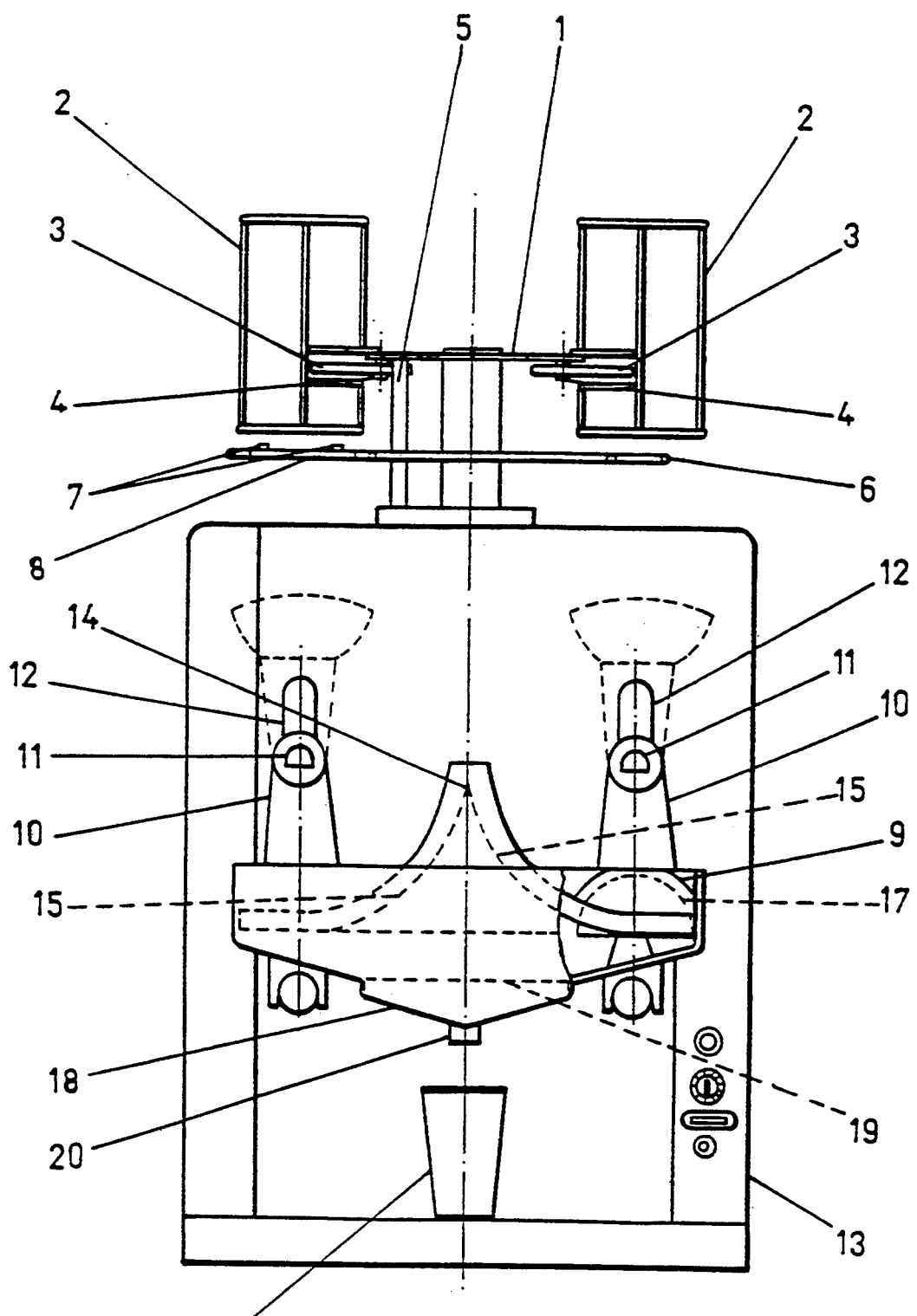
FIG. 2 is a view similar to that of FIG. 1 with the machine in question being in the position for squeezing fruit.
Figure 3:
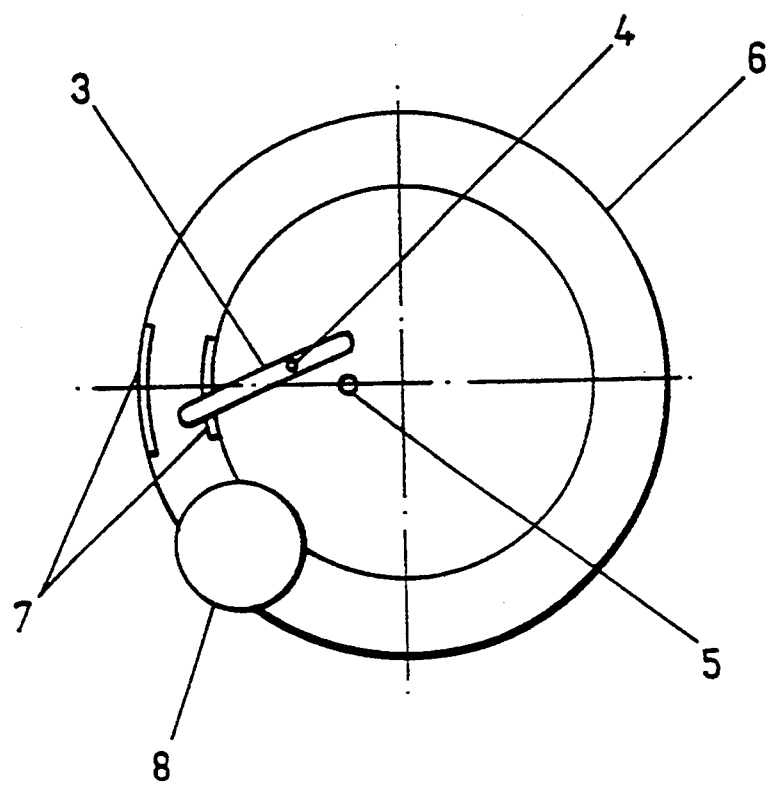
FIG. 3 is a plan view of a slide track forming part of the supply assembly, with the track comprising a window through which pieces of fruit fall toward the alveoli due to the effect of gravity.

Starting in upward facing uppermost position (FIG. 1), the alveoli 9 and the arms 10 rotate through 180° until they reach a lower, opposite, downward facing position (FIG. 2) following a semicircular trajectory, and in such a way that when said alveoli 9 are facing horizontally toward each other the piece of fruit is cut through the middle by means of an intermediate blade 14, each of the two equal halves locating in the corresponding alveolus, and thereafter travel the remaining 90° of their circular trajectory along slip ramps 15, at the lower ends of which are circular windows 26 in horizontal ledge 27 that is below ramps 15. Windows 26 face squeezing cones 17. Beneath cones 17, and in a corresponding position thereto, is a tray 18 provided with a juice filter sieve 19, said tray comprising a small lower tube 20 through which the juice flows into a glass 21 or similar receptacle.

With this arrangement, when the alveoli 9 which contain the two halves of the piece of fruit are in the lower position facing the cones 17, and of course the circular windows 26, they descend vertically downwards together with the arms 10 and the axes 11, guided by the grooves 12, in such a way that the two halves of the piece of fruit are thoroughly squeezed by pressing against the cones 17, the juice thereby falling into the tray 18 and from there into the glass 21. The slip ramps 15 and ledge 27, as well as the blade 14, are linked to the axes 11 and are guided by a central vertical groove 22 along which they follow the vertical movement of the arms 10, the alveoli 9 and the axes 11.

Once the juice has been extracted, the alveoli 9 rise upwards, the pieces of peel of the fruit resting over the circular windows 26. The ramps 15 and ledge 27 rise in unison a certain amount of time after the alveoli, the delay being sufficient for the alveoli to cover at least half of the way to their initial position. After the alveoli 9 have risen, the arms 10 are made to rotate in the opposite direction until they reach their initial upwardly facing position where one of the alveoli 9 receives another piece of fruit which falls due to the effect of gravity from one of the containing sleeves 2. The same cycle is then repeated, said pieces of peel trapped by legs 29 of small flaps over the circular windows 26 being moved and ejected by means of the alveoli 9 themselves which run into said pieces of peel at the end of their trajectory.

The machine of the invention, which is provided with a manual or coin-operated cycle selector, can accept pieces of fruit of various sizes. Therefore, the windows 26 situated above the squeezing cones 17 are provided with small flaps 16 which descend and rise with ledge 27, during both the fruit pressing cycle and the cycle in which the rind or peel is lifted for extraction, and as they move they follow closely the profile or surface of the squeezing cone, thus preventing the fruit and peel from falling even in cases of large differences in size.

The cleaning process is easy since all the component parts which come into contact with the juice can be assembled and disassembled in a matter of seconds without the need of tools. Furthermore there are no corners in which the juice might collect to ferment and become contaminated.

I claim:

1. A machine for squeezing generally spherical fruit to extract juice therefrom, said machine comprising:
   first and second alveoli each mounted to pivot back and forth between an upward facing position and a downward facing position, with both of said alveoli being in their said upward facing positions at the same time and being in their said downward facing positions at the same time, and while being pivoted back and forth between said upward and downward facing positions said alveoli passing through a mid position where they are generally horizontal and face one another;
   a device for feeding a complete unit of fruit to said first alveolus while it is in its said upward facing position;
   a knife for cutting said unit of fruit into first and second pieces as said first alveolus passes through said mid position, and with first and second pieces being carried by said respective first and second alveoli as they move to their downward facing positions;
   first and second squeezing cones being below and vertically aligned with the respective first and second pieces when said alveoli are in said downward facing positions; and
   slip ramps along which said pieces slide as said alveoli pivot toward their downward facing positions.
   wherein with said alveoli in said downward facing position, said alveoli and said slip ramps being operatively mounted together for simultaneous relative linear movement vertically toward said cones whereby said cones engage said pieces to squeeze same and extract juice therefrom, said alveoli and said slip ramps being operatively separately mounted for separate relative movement away from said cones.

2. A machine as set forth in claim 1 in which the device for feeding a complete unit of fruit to the first alveolus comprises:
   sleeves that contain a plurality of complete units of fruit from which juice is to be extracted; suspending dispensing cams for supporting said units of fruit inside of said sleeves;
   a load divider mounted for rotation in a horizontal plane and being coupled to said sleeves;
   a slide track having a window;
   a stop to engage said cams and thereby pivot same to permit one of said units of fruit to be conveyed by gravity to said slide track and through said window into one of said alveoli while it is in said upward facing position.

3. A machine as set forth in claim 2 also comprising small flaps positioned above said cones, said flaps supporting said pieces and peels that remain from said pieces after the pieces are squeezed by said cones for preventing said pieces and peels from falling.

4. A machine as set forth in claim 1 in which during relative linear movement of said cones and said alveoli toward one another, said alveoli move linearly downward, said machine further comprising:
   a first guide to direct movement of said alveoli vertically;
   a second guide to direct displacement of said ramps and said knife simultaneously with vertical movement of said alveoli.

5. A machine as set forth in claim 1 in which during relative linear movement of said cones and said alveoli toward one another, said alveoli move linearly downward, said machine further comprising:
   a first guide to direct movement of said alveoli vertically;
   a second guide to direct displacement of said ramps and said knife simultaneously with vertical movement of said alveoli.

6. A machine as set forth in claim 1, wherein during separate relative movement of said alveoli and said slip ramps, said alveoli recover at least half of the way to their initial position.

7. A machine as set forth in claim 1, wherein pieces of peel are ejected by said alveoli during a final part of the alveoli trajectory.

* * * * *